United States Patent Office 3,473,190
Patented Oct. 21, 1969

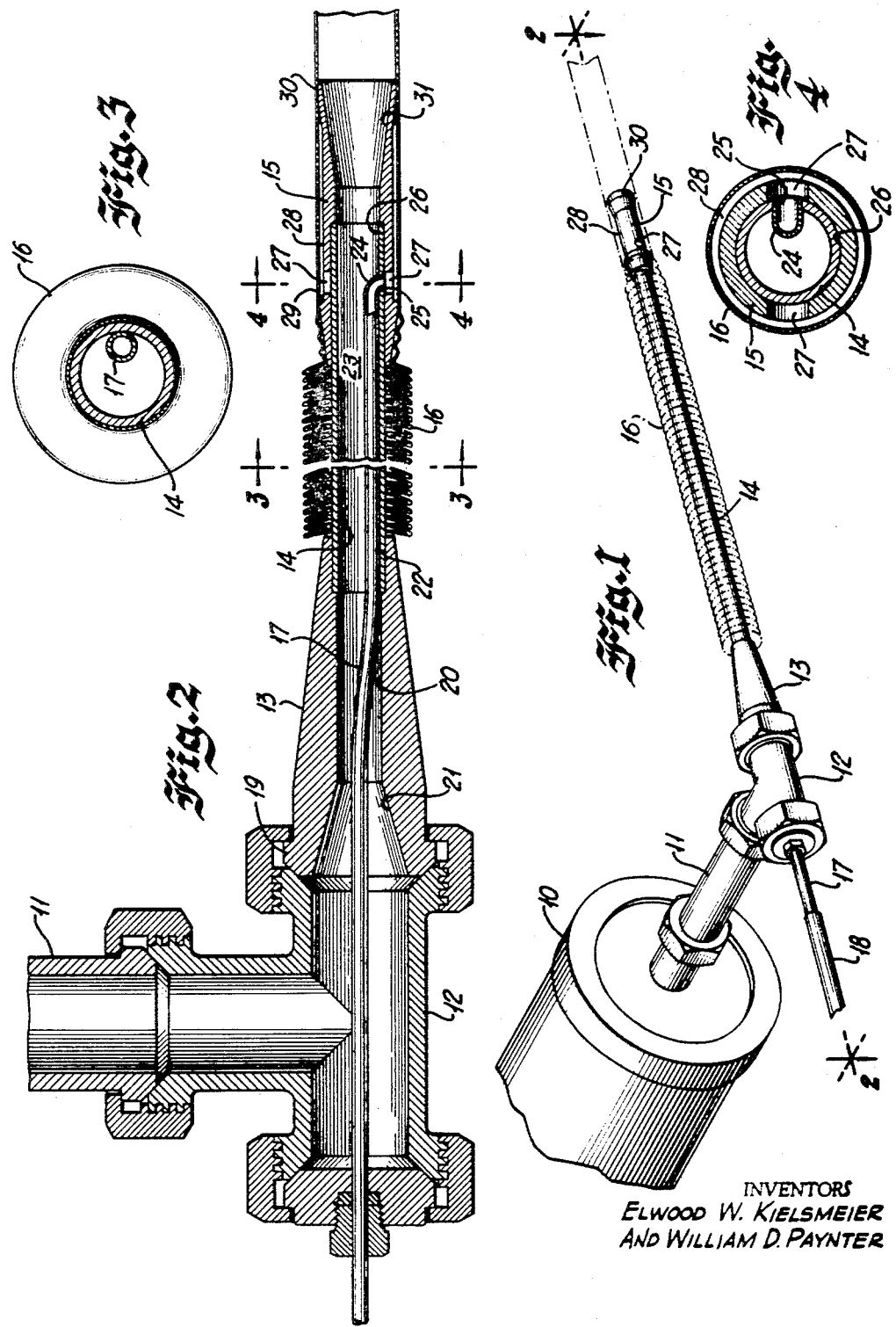

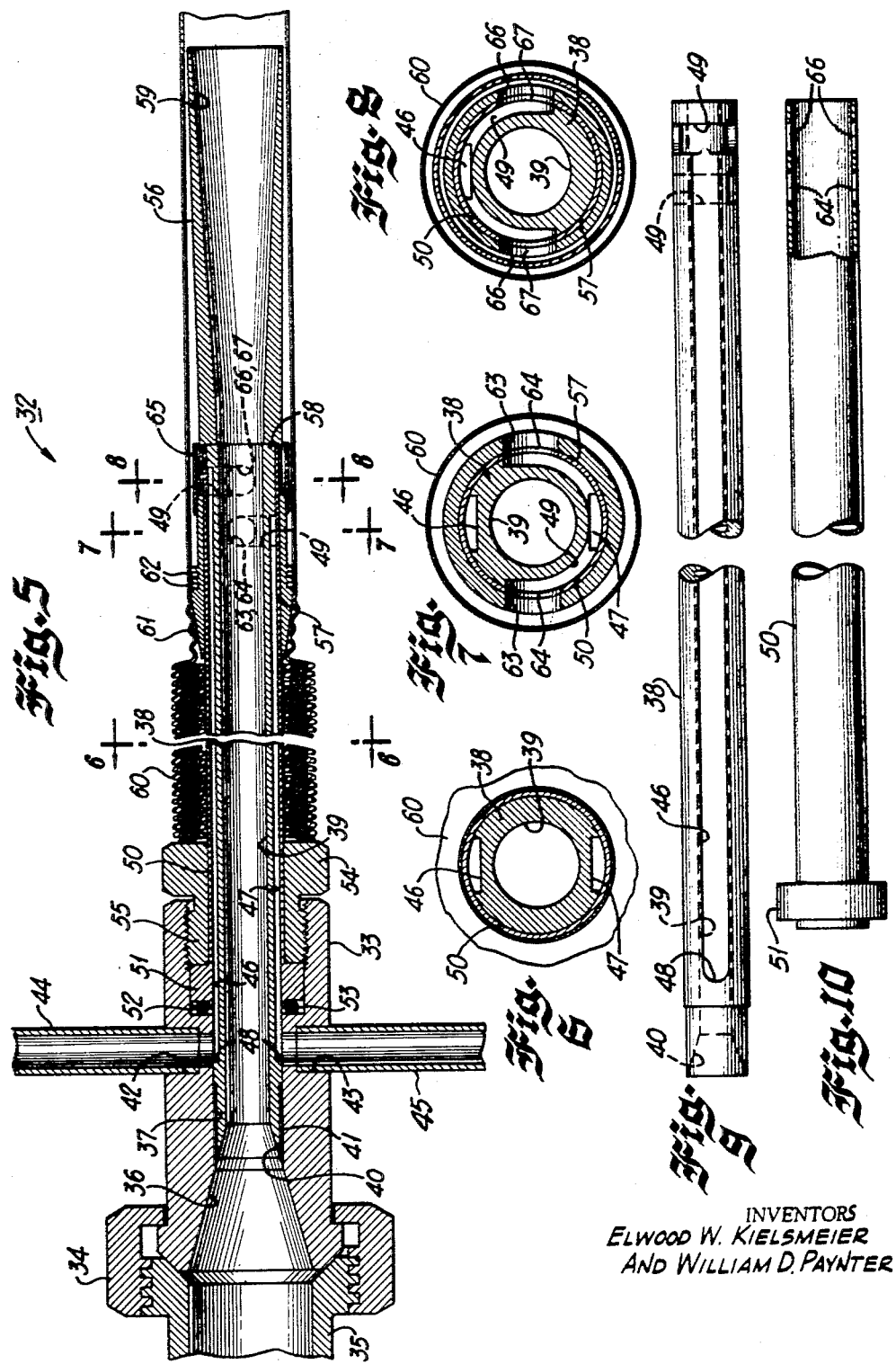

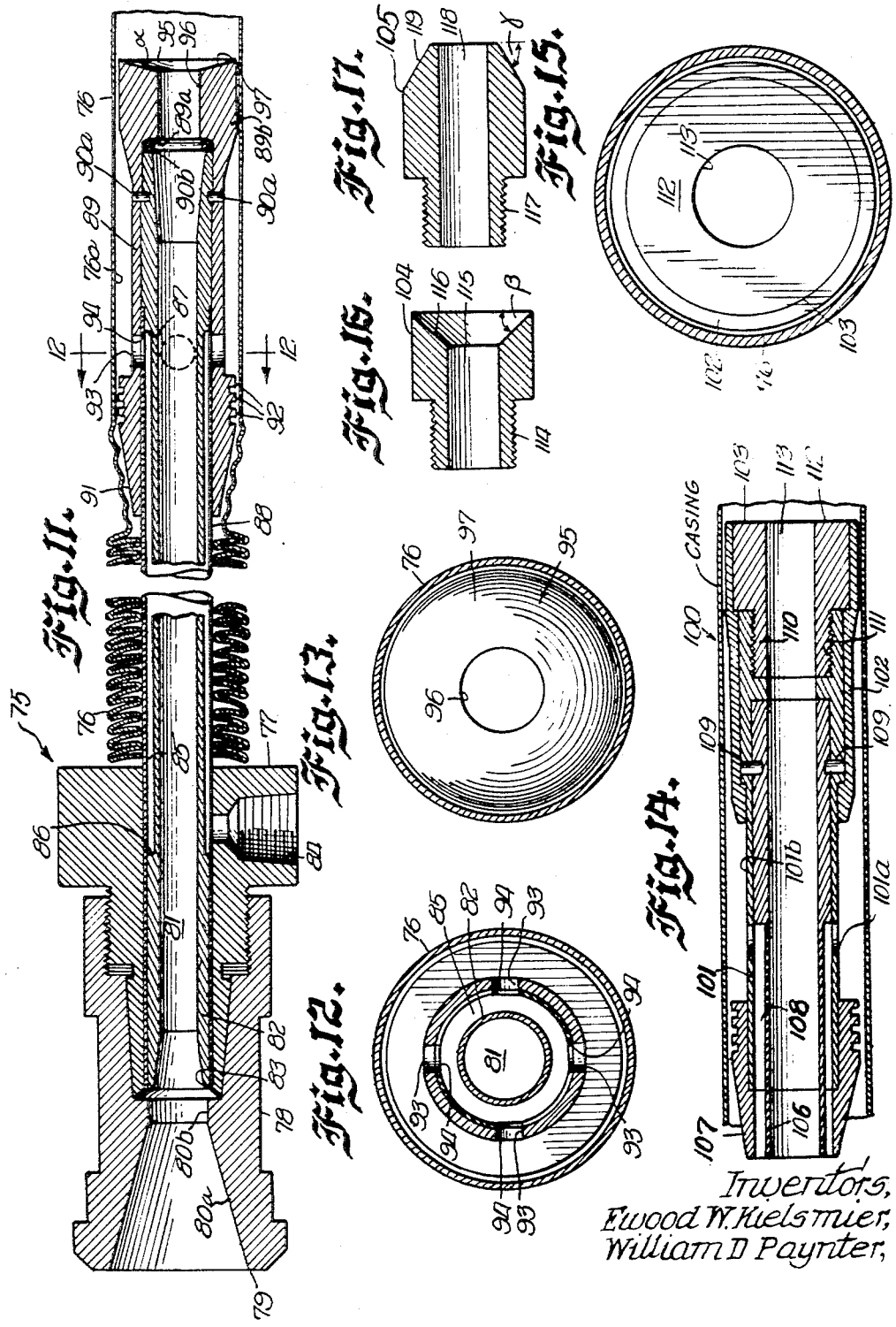

3,473,190
COLLAGEN FIBER COATED PRODUCT AND METHOD AND APPARATUS FOR FORMING SAME
Elwood W. Kielsmeier and William D. Paynter, Madison, Wis., assignors to Oscar Mayer & Co., Inc., Chicago, Ill., a corporation of Illinois
Division of application Ser. No. 620,564, Oct. 14, 1966, now Patent No. 3,399,423, which is a division of application Ser. No. 497,592, Oct. 5, 1965, now Patent No. 3,306,754, which in turn is a continuation-in-part of application Ser. No. 198,040, May 28, 1962. This application May 2, 1968, Ser. No. 739,988
Int. Cl. A22c 7/00, 11/00
U.S. Cl. 17—41          2 Claims

ABSTRACT OF THE DISCLOSURE

An extrusion nozzle tip for stuffing high fat content sausage batter or emulsion into a casing. In particular, the nozzle tip is provided with a relatively small central orifice and abruptly flared end wall which enables the ground material to expand and migrate to the casing surface in a rapid and particulate manner which avoids a fat smeared surface.

This application is a division of Ser No. 620,564, filed Oct. 14, 1966, now Patent No. 3,399,423 which in turn is a division of Ser. No. 497,592, filed Oct. 5, 1965, now Patent No. 3,306,754 which in turn is a continuation-in-part of our copending patent application, Ser. No. 198,040, filed May 28, 1962.

The present invention is directed to a new and improved sausage-type product provided with a fibrous collagen coating which sustains the shape of the product during handling and cooking thereof and which further is fully and readily edible with the product. The invention is also directed to means by which the new and improved product of the invention is formed, such means including a unique method of collagen application and treatment during product formation and special stuffing apparatus capable of providing simultaneous collagen application during product formation.

Many sausage-type products, i.e. pork sausage and the like, are prepared by the stuffing of the sausage emulsion or batter into natural casings such as, for example, those formed from the intestines of sheep. Products of this type are merchandised in link form with the emulsion contained within the casing to sustain the shape of the product during cooking thereof by the consumer or during heat processing thereof by the manufacturer. These natural casings although completely edible are not readily masticated. Furthermore, since such casings are not of uniform diameter they create a product weight and size control problem for the manufacturer. The problem of size is of particular concern in connection with utilization of continuous product forming and packaging procedures and equipment as variations in diameters of the links of the product are difficult to accommodate in such continuous procedures. Additionally, the use of natural casings creates a problem of bacterial contamination which must be carefully controlled.

In an effort to overcome the foregoing problems, synthetic casings have been used. These casings permit better product size and weight control as the diameters thereof are subject to less variation. However, the artificial casing although fully edible, is no more desirable than natural casings from the standpoint of mastication and organoleptic quality.

It has been proposed that a fibrous collagen coating can be substituted for natural and synthetic casings for the purpose of sustaining the product shape during cooking. While a collagen coating of this type eliminates the undesirable aspects accompanying the use of natural and synthetic casings, it has been found difficult to apply and maintain the coating on the product to such an extent that it serves the full purpose of a casing. For example, application of a uniform coating over the entire exposed surface of the product is often difficult to control. Furthermore, collagen fiber arrangement in such a coating affects the over-all efficiency of the coating.

The extrusion of collagen, by itself, through an annular glass or metal mold to form a tubular collagen casing has also been proposed. Collagen tubing formed in this manner is generally thick walled in order that it have the desired degree of strength. These extrusion techniques involve hardening and tanning steps which together with the wall thickness thereof render the product so-formed difficult to masticate and accordingly, not completely satisfactory for use as a food project.

It is therefore an object of the present invention to provide a new and improved fibrous collagen coated product, such as a product of the sausage variety, including, for example, pork sausage, wieners and the like.

Another object of the present invention is to provide a new and improved fibrous collagen coated product wherein the collagen coating is characterized by a fiber orientation which improves the nature and quality thereof.

A further object is to provide a new and improved method of forming a fibrous collagen coating particularly suitable for use in making sausage-type products, the method involving the extension of a fibrous collagen dispersion into a water permeable tubular mold such as, for example, a cellulose casing or equivalent thereto.

A still further object of the present invention is to provide a new and improved method for the application of a fibrous collagen coating to sausage-type products wherein the collagen and sausage emulsion extrusion are carried out simultaneously in a product-confining mold such as, for example, a cellulose casing or equivalent thereto.

Another object is to provide a new and improved method of preparing a sausage-type product having applied thereto a fibrous collagen coating capable of sustaining the product during heat processing thereof, the method including the application of a fibrous collagen dispersion to the product simultaneously with the stuffing thereof in a mold, and further including subsequent treatment of the coating while contained in the mold followed by removal of the product from the mold, this method resulting in a collagen coated product exhibiting new and improved properties and capable of efficiently undergoing cooking without crumbling or other undesirable shape transformation.

A further object is to provide a new and improved method for the application of collagen fibers to the surface of a sausage-type product to establish thereon a skin-like coating capable of sustaining the product during the cooking thereof, the method in at least one form thereof involving the utilization of acid/or alkaline swollen collagen fibers.

A further object of the present invention is to provide a new and improved method of preparing a sausage-type product having a fibrous collagen coating capable of sustaining the product during heat processing thereof, the method in at least one embodiment thereof involving the utilization of lactic acid swelled collagen fibers.

A still further object of the present invention is to provide a new and improved method of preparing a sausage-type product having a skin-like fibrous collagen coating capable of sustaining the product during heat processing, the method in at least one form thereof involving applying a lactic acid swelled fibrous collagen dispersion to the product simultaneously with the stuffing thereof in a water permeable mold and further including subsequent treatment of the coating while contained in the mold followed by removal of the product from the mold, this method resulting in a collagen coated product exhibiting advantageous new properties.

An additional object is to provide new and improved apparatus for the simultaneous stuffing and coating of sausage-type products, the apparatus including new and improved features of coating application to provide for automatic uniform coating of sausage batter or emulsion during the stuffing thereof into a casing.

Another object is to provide new and improved stuffing apparatus for use in the application of acidic and/or alkaline collagen dispersions of the surface of a product during stuffing thereof into a casing.

A yet further object of the present invention is to provide an improved stuffing apparatus which includes a novel stuffing horn or nozzle which advantageously provides an orderly arrangement of the lean and fat particles in the stuffed sausage product.

A yet further object of the present invention is to provide an improved stuffing apparatus equipped with a novel stuffing horn or nozzle which avoids smearing of the fat particles on the inner surface of the sausage casing, thereby providing an improved sausage product.

Other objects not specifically set forth will become apparent from the following detailed description of the invention made in conjunction with the accompanying drawings wherein:

FIG. 1 is a fragmentary perspective of one form of new and improved stuffing apparatus constituting a part of the present invention;

FIG. 2 is a framentary longitudinal section of the stuffing horn of the stuffing apparatus taken generally along the line 2—2 of FIG. 1;

FIG. 3 is a transverse section of the extruding tube of the horn taken generally along line 3—3 in FIG. 2;

FIG. 4 is a transverse section of the stuffing nozzle and extruding tube portion received therein as viewed generally along line 4—4 of FIG. 2;

FIG. 5 is a fragmentary longitudinal section of a modified form of stuffing horn forming a part of this invention;

FIG. 6 is a transverse section of the horn of FIG. 5 taken generally along line 6—6 therein;

FIG. 7 is a transverse section of another portion of the horn of FIG. 5 taken generally along line 7—7 therein;

FIG. 8 is still another transverse section of the horn of FIG. 5 taken generally along line 8—8 therein;

FIG. 9 is a fragmentary elevation of the extruding tube of the horn of FIG. 5;

FIG. 10 is a fragmentary elevation of the extruding tube sleeve of the horn of FIG. 5;

FIG. 11 is a fragmentary longitudinal section of a further modified form of stuffing horn equipped with the improved horn end which form a part of the present invention;

FIG. 12 is an enlarged transverse section of the stuffing horn tip of FIG. 11 taken generally along 12—12 therein;

FIG. 13 is an enlarged view of the stuffing horn tip illustrated in FIGS. 11 and 12;

FIG. 14 is a longitudinal section of a horn end assembly, comparable to those illustrated in FIGS. 1–13, which is equipped with a further modified form of stuffing horn tip forming a part of the present invention;

FIG. 15 is an enlarged end view of a stuffing horn tip illustrated in FIG. 14;

FIG. 16 is a longitudinal section of another embodiment of a stuffing horn tip forming a part of the present invention; and FIG. 17 is a longitudinal section of a third embodiment of a stuffing horn which also forms a part of this invention.

In a prefererd embodiment of the method of the present invention, a fibrous collagen dispersion is injected or otherwise suitably introduced into a water permeable mold concurrently with the stuffing of the mold with sausage-type product emulsion. Cellulose casing has been advantageously used in this capacity, i.e. as the mold for confining the collagen and controlling the thickness thereof. It should be noted, however, that other molds or confining means exhibiting similar properties of water permeability may be employed with the simultaneous extrusion technique of the present invention. Accordingly, as used hereinafter, the term "casing" is intended to cover all forms of water permeable product confining molds, both those of a cellulosic or equivalent film composition as well as permanent type molds having the characteristic or property of enabling drying of a collagen coating while it is confined in said mold.

The injection or extrusion is such that the collagen dispersion is deposited on the surface of the sausage-type product between the same and the inner surface of the water permeable mold or casing resulting in the collagen being confined on the surface of the product by the mold or casing. As a result of this concept, collagen coating of the product can be automatically carried out simultaneously with the stuffing of the product in the mold or casing. The mold or casing not only sustains the product in its proper form while the collagen is subsequently treated to establish an independent product sustaining skin-like coating, but also acts on the collagen coating and protects the same during the forming and processing thereof.

Generally the fibers of the collagen dispersion may be acid or alkaline swollen. In this connection, it should be noted that lactic acid, being a natural ingredient of meat, can be advantageously employed as the collagen swelling agent since its presence in the sausage-type product, at least in residual quantities, is not objectionable. Accordingly, when lactic acid is employed, the stuffed sausage-type product can be washed to remove excess acid and further treated in accordance with the present invention. When other acids or bases are used as the collagen swelling agent, the collagen fibers may be neutralized following application to the product. While lactic acid swelled collagen fibers can, if desired, be neutralized with a suitable base, the use of water alone has been found sufficient to render the collagen coated product suitable for human consumption. Where neutralization is employed, the acidic or basic dispersion may be neutralized during or following product application using alternative procedures as will be described.

The fibrous collagen dispersion is prepared preferably from tendons although other suitable sources of collagen may be used. As an example of collagen dispersion preparation, beef heel tendons in fresh condition are washed thoroughly and then frozen into blocks at a suitable temperature such as 0° F. Following freezing, the blocks are sliced into very thin strips with the slicing being carried out in the direction of the grain of the fibers. Since the thickness of the strips governs the soaking time necessary to effect collagen swelling, it is preferred that the slices be at least as thin as about 1/32 of an inch. When swollen, the slices form in effect, fibril bundles consisting of collagen fibers of substantial length. In other words, the procedure used in preparation of the collagen will include steps which maintain the fiber length as much as possible within reasonable bounds.

The collagen slices are then swollen by treatment with the acid or base. In a preferred embodiment of the method of the present invention the collagen slices are swollen by treatment with 0.08 N lactic acid, however, the concentration of lactic acid suitable for use as the collagen swelling agent can range from 0.04 N to 1.0 N. Hydrochloric acid and sodium hydroxide have also been advantageously used as collagen swelling agents. Other acids may also be employed either in place of, or in conjunction with, the above mentioned acids and base. In order to reduce acid (or base) removal and oxymyoglobin problems, it is preferred that the amount of acid (or base) used be the minimum amount which will produce a well dispersed collagen suspension.

During swelling of the collagen fibers, the fibril bundles become separated and a suspension of swollen fibers results. It has been found that collagen is not easily kept in suspension in the pH range of from 4.0 to 9.0. Accordingly, it is preferred that any acid swelling be carried out in the pH range of from about 1.0 to 3.5 and alkaline swelling will be carried out within the pH range of from about 11.0 to 13.0. A collagen concentration range of from about 0.5% to 3.5% in suspension with 0.08 N lactic acid will result in a pH of from about 3.0 to 3.5. The time of contact of the collagen with the acid or alkali for swelling purposes prior to homogenization may range from a few hours to three or four days depending upon the particle size of the collagen used, the concentration of the acid or alkali, the temperature of holding, and the source of the collagen material used. Very finely divided collagen soaked at room temperature in the acid or alkali requires but a few hours for proper swelling. Conversely, if coarse tendon pieces are treated at 32° F., the time required for swelling is substantially extended.

Following swelling of the collagen fibers, the suspension is then homogenized by suitable mixing such as introduction into a colloid mill. Preferably, the suspension is run through such a mill several times with the mill having a "fine" setting. The purpose of the homogenization step is to form a uniform dispersion of swollen collagen fibers. The resulting dispersion may be used immediately in the coating of sausage-type products during stuffing or may be held for an extended period at 32° F.

The dispersion is then applied to the product between the mold or casing and the product surface with the mold or casing acting to confine the dispersion to the product surface and aid in controlling the depositing thereon to form a uniform fiber mat-like matrix coating.

In systems employing lactic acid swelled collagen, the product, after the stuffing and/or linking step, can be passed through a cold water bath to wash out the excess lactic acid and, at the same time, precipitate the collagen. The collagen precipitates out of the suspension at a pH of about 4.5 forming a mat-like matrix on the surface of the product within the casing. As was noted previously, any residual lactic acid which remains after the washing operation is not objectionable since this acid is a natural ingredient of meat. The washing time will of course vary with the particular washing technique used, however, it has been found that an immersion of the product in a cold water bath at a temperature of about 40° F. for about one minute is usually sufficient.

In one embodiment of the method of the present invention, a suitable acid or base solution (non-collagen bearing) can be injected into the casing with the collagen dispersion. For example, if an acid swelled collagen is employed, a base solution could be injected consecutively thereafter. Similarly, if a base swelled collagen were employed, a non-collagen bearing acid solution could be used. Similarly, equal quantities of acidic and basic collagen dispersons can be introduced into the casing consecutively. The general concept here being to provide at least partial neutralization of the collagen dispersion(s) as it is applied to the sausage emulsion. Where it is necessary to use a neutralizing step following intermediate product formation, the product can be treated with an acid or alkaline bath depending on the nature of the collagen dispersion. Where hydrochloric acid swollen fibers are used, the alkaline bath may be an 0.1 normal sodium hydroxide solution. Where sodium hydroxide swollen fibers are used, the acid bath may be a solution of 0.1 normal hydrochloric acid. The neutralizing solution is of sufficient strength to provide for neutralization of the collagen coating through the product casing to the extent indicated above (i.e. providing a resultant pH of the coating of between 5.4 to 6.0, the pH range of most sausage emulsions or batters).

The reaction caused by neutralization is at least to a certain extent one of precipitation with the collagen fibers being established on the surface of the product within the casing to form a mat-like matrix. Neutralization using hydrochloric acid or sodium hydroxide results in reactions to form sodium chloride and water. The sodium chloride in the natural salt ingredient of sausage formulas and is the chemical used for preservation of natural casing during shipment and storage thereof. Immersion time for neutralization can be as little as 5 to 10 seconds but preferably will be extended for 30 seconds to insure the desired degree of neutralization. It may be desired following neutralization to further subject the resultant product to a plain water bath to remove any excess neutralizing solution as well as residual soil formed as a result of neutralization. Immersion time for the water bath treatment where used may be on the order of 1 minute.

Where a cellulose or equivalent casing is used, the intermediate sausage product can be linked at any time subsequent to formation thereof. Normally, the linking operation occurs prior to washing or neutralization of the collagen coating where these subsequent steps are utilized.

The product is then subject to drying treatment to dry the collagen coating and set the same permanently as a sustaining case about the product. Drying may be accomplished in any suitable manner as long as the collagen coating is adequately set for the intended purposes. Relative humidity, temperature and velocity conditions of the air used in drying the collagen coating can, of course, vary over a wide range. In this connection, and by way of example only, it has been found that air having a dry bulb temperature of about 40° F. and a wet bulb temperature of about 32° F. passed over the product at a velocity of about 1200–1500 linear feet per second will dry the product in about 20 minutes without any deleterious effect on product color.

Following drying, the product is in condition for casing or mold removal. Removal techniques will, of course, vary somewhat by reason of the nature and characteristics of the particular casing or mold employed. Where cellulosic and like casings are used, it has been found that removal thereof can be greatly facilitated by first freezing the product. In this connection, 0° F. air moving over the product at between 800 and 1000 linear feet per second will reduce the internal temperature of the product to about 15–20° F. in about 10 to 12 minutes. Similarly, freezing to this same temperature can be accomplished by dipping the product in circulated salt brine at 10° F. for about 10 minutes.

After freezing the product is moistened sufficiently to provide for complete release between the casing and the collagen coating which has been set up on the product surface. In order to moisten the product sufficently for skinning purposes, it is necessary merely to wet the outer surface of the product such as by dipping the same into a brine solution maintained at a temperature of about 15° F. for from 1 to 2 minutes. A skinning machine which has been advantageously employed in removing cellulosic and equivalent casings is described in the co-owned copending application entitled, "Sausage Skinning Machine" filed Sept. 17, 1965, Ser. No. 487,987. The foregoing merely constitutes an example of a suitable moistening and skinning operation and is not critical to the efficient practice of the present invention. Any other suitable means by which the casing or mold may be loosened from the product without harm done to the collagen coating can be used.

Preferably, the amount of collagen applied to the product will be substantially on the order of the thickness of a natural sheep casing. In considering the collagen fibers present in natural casings, it has been established that the fibers create a lattice-type arrangement with orientation in both a longitudinal and lateral direction. The collagen fibers of the finished coating of the present invention exhibit a tendency toward orientation longitudinally of the product with substantially less lateral direction. In accordance with one aspect of the present invention, it has been discovered that this directed orientation produces advantageous sustaining properties of the coating during cooking of the product. The tendency toward lateral shrinkage of the coating during product frying is materially reduced thus permitting better retention of over-all product shape and appearance. by use of the method of simultaneous product coating during casing stuffing thereof, the subsequent linking operation provides for uniform depositing of the fibrous collagen about the ends of the product. The frying characteristics of the product are improved as there is less extrusion of the product from the collagen coating, particularly the ends thereof. The uniform coating provided throughout the entire surface of the product by reason of the particular method of coating application stands up well during product handling and the controlled application of the collagen to the product reduces the tendency of the product to adhere to a pan during frying thereof. The product browns well throughout its entire surface during frying and is less tough than products using natural or synthetic casings.

By a practice of the method of the present invention it is possible to completely eliminate the use of natural casings and thus remove the specific difficulties accompanying such use. The uniformity of the synthetic cellulose or equivalent casings or molds employed in accordance with the method of the present invention provides better product size and weight control and minimizes the problems of bacterial contamination. With these advantages in mind, the sausage product prepared in accordance with this invention is more readily adapted for continuous preparation and packaging operations.

As mentioned above, other suitable acids and bases may be used although lactic acid is preferred since any residual lactic acid which remains after the washing step is neither harmful nor undesirable. Accordingly, a neutralization step, as such can be eliminated. The coating formed on the product is quite capable of efficiently withstanding subsequent product treatment such as smoke treatment including the dipping of the product in a smoke solution following drying and skinning thereof. If desired, a suitable smoke solution may also be added to the collagen dispersion prior to application thereof on the product during extrusion.

In the above description of a preferred embodiment of the method of the present invention the swelled collagen and sausage batter are extruded simultaneously into a tubular mold or casing having the characteristic of being water permeable which, as was explained above, enables the collagen coating to be dried in situ. It should be noted, however, that the swelled collagen can also be extruded into a tubular mold or casing without simultaneous extrusion of sausage batter. In accordance with a specific application of this latter technique, it has been found that if the cellulose or equivalent casing is expanded by means of air or some other medium swelled collagen when extruded thereinto will adhere to the interior surface of the casing or mold and can be dried thereon.

In practice, this technique has been accomplished by discharging a jet of air along the central longitudinal axis of a celluosic casing simultaneous with the extrusion of swelled collagen onto the inner wall of the casing or mold. The air stream provided the flexible casing with a semi-rigid form and at the same time maintained the extruded collagen on the interior wall thereof until the desired degree of drying was effected.

After drying, the collagen coated casing was stuffed with sausage batter and linked. The collulose casing was then removed in the manner described above, leaving a collagen coated sausage product which exhibited all of the advantages of those prepared in accordance with the preferred embodiment of the present invention (i.e. improved frying characteristics, uniform browning and substantially less shrinkage of coating during the cooking and frying thereof). If should be noted that the collagen coated cellulose casing, after being dried could rave been stored indefinitely if it were not desired to proceed immediately with the stuffing operation.

FIGS. 1–4 illustrate one form of stuffing horn apparatus constituting a part of the present invention and designed for the purpose of simultaneously depositing a collagen dispersion on the surface of the product during stuffing thereof in a casing. As generally illustrated in FIG. 1, the apparatus includes a known type of stuffing cylinder or box 10 delivering sausage batter or emulsion through a pipe 11 under stuffing pressure in a T connection 12. The T connection 12 has attached at one end thereof an emulsion extruding tube holder 13 which supports an extruding tube 14 in the outer end thereof. The outermost end of the tube 14 has mounted thereon a nozzle 15, about which a casing 16 is received. A coating material delivery tube 17 extends through the extruding tube 14 as will be described and also extend through the T connection 12 projecting outwardly from the opposite end thereof for connection with a coating material suply tube 18.

FIG. 2 illustrates the stuffing horn design in detail. The tube holder 13 includes a flanged end portion 19 for attachment with the T connection 12. An internal longitudinal passage 20 is provided in the tube holder and one end thereof is enlarged with a flare 21 for communication with the T connection 12 and the delivery of sausage emulsion under pressure through the tube holder and into the extruding tube 14. The opposite end of the passage 20 opens into an enlarged bore 22 in which is suitably fixed the inner end of the extruding tube 14. The extruding tube 14 is provided with a central longitudinal emulsion delivery passage 23 which has mounted therein the coating material delivery tube 17. This tube is mounted against one inner side wall portion of the tube 14 and extends substantially the full length thereof while projecting from the inner end of the tube 14 through the tube holder 13 and T connection 12. The tube 17 extends to just short of the outer end of the extruding tube 14 and is provided with a radially outwardly directed terminus 24 which is received in an aperture 25 formed in the wall of the tube 14.

The nozzle 15 includes a bore 26 in which the outermost end of the extruding tube 14 is fixed. This bore has in communication therewith a radially outwardly directed aperture or passage 27 which is directly aligned with the aperture 25 in the extruding tube and is in communication with the coating material delivery tube 17. With this arrangement the coating material is delivered longitudinally of the extruding tube 14 within the tube 17 and maintained separate from the sausage emulsion undergoing extrusion through the tube 14. The coating material is then delivered through the aperture 27 of the nozzle and onto the outer surface portion 28 of the nozzle 15. Immediately rearwardly of the aperture 27 on the outer surface of the nozzle 15 there is formed a casing spacing rib 29 which is circumferentially continuous about the nozzle. The rib 29 projects radially outwardly from the coating material receiving area 28 and functions as a shield for this area to maintain the casing 16 in radially outwardly spaced relation to establish sufficient area to receive and distribute the coating material about the nozzle 15. The function of the rib 29 is further enhanced by the outer end of the nozzle 15 being provided with an outwardly flared extrusion portion 30, the outer surface of which is located in the same longitudinal plane as the outer surface of the rib 29. In this manner the casing is in contast with the outer surfaces of the rib 29 and flare 30 to provide for uniform accumulation of coating material along the area of nozzle 15. The flare 30 is provided with an internal emulsion delivery passage 31 in communication with the bore 26 for the extrusion of emulsion directly into the casing 16 accompanied by injection of the coating material between the casing 16 and the extruded emulsion.

The particular apparatus described provides for simultaneous uniform introduction of emulsion and coating material into a casing in an efficient and uncomplicated manner. The emulsion and coating material move together in separated condition throughout the length of the extruding tube 14 and uniformity in temperature conditions is established prior to actual contact therebetween. The following are specific examples of the practice of the method of the invention using the apparatus described.

EXAMPLE 1

Beef tendons were frozen at 0° F. and then sliced longitudinally to form strips having a thickness of approximately 1/32 of an inch. The slices were swollen in a 0.1 N hydrochloric acid solution for 72 hours at 32° F. The swollen tendons were then passed 5 times through a Loher & Sohne Kolloid Mill (Model 586–440) having a zero setting. The resultant suspension was held at 32° F. until used. A "Vicking" No. 23 casing was used as the water permeable mold and was mounted over the extruding tube 14 of apparatus of the type shown in FIGS. 1–4. Collagen dispersion was pumped through the delivery tube 17 simultaneously with the pumping of conventional pork sausage emulsion through the extruding tube 14. Stuffing was carried out in accordance with conventional techniques except that the collagen suspension was simultaneously injected into the casing along with the stuffing of the sausage emulsion therein. Following stuffing, the encased product was linked and then washed in 0.1 N sodium hydroxide at 32° F. for 1 minute. The product was dried for 20 minutes in air at a dry bulb temperature of 40° F., a wet bulb temperature of 32° F., moving at about 1,000 feet per second. After drying, the product was frozen to 15–20° F. in 0° F. air moving at about 1500 feet per second. Following freezing, the product was washed in salt brine at 15° F. for 1 minute, and thereafter the cellulose casing mold was removed.

EXAMPLE 2

Beef tendons were frozen and sliced longitudinally to form strips having a thickness of approximately 1/32 of an inch as was described in Example 1. The slices were then swollen in a 0.09 N lactic acid solution for 72 hours at 32° F. The swollen tendons were then passed 5 times through a Loher & Sohne Kolloid Mill (Model 586–440) having a zero setting. The resultant suspension was held at 32° F. until used. A "Vicking" No. 23 casing was used as the water permeable mold and was mounted over the extruding tube 14 of apparatus of the type shown in FIGS. 1–4. Collagen dispersion was pumped through the delivery tube 17 simultaneously with the pumping of conventional pork sausage emulsion through the extruding tube 14. Stuffing was carried out in accordance with conventional techniques except that the collagen suspension was simultaneously injected into the casing along with the stuffing of the sausage emulsion therein. Following stuffing, the encased product was linked and then washed in water at 32° F. for 1 minute. The product was dried for 20 minutes in air at a dry bulb temperature of 40° F., a wet bulb temperature of 32° F., moving at about 1,000 feet per second After drying, the product was frozen to 15–20° F. in 0° F. air moving at about 1,500 feet per second. Following freezing, the product was washed in salt brine at 15° F. for 1 minute, and thereafter the cellulose casing mold was removed.

FIGS. 5–10 illustrate a modified form of stuffing horn 32 used for the consecutive extrusion of acidic and basic collagen dispersions during the extrusion of sausage emulsion into a casing. The horn 32 includes a tube holder 33 connected by a locking nut 34 at one end thereof to an emulsion delivery pipe 35 extending to a suitable stuffing cylinder or box. The holder 33 at one end thereof in communication with the pipe 35 is formed with an internal flare passage 36 receiving the sausage emulsion therein under pressure from the pipe 35. The central passage 37 of the holder 33 receives therein one end of an extruding tube 38 having an internal longitudinal emulsion delivery passage 39 the inner end of which is formed with a flare 40 conforming with the flare passage 36. The tube 38 is fixed in the passage 37 by a silver solder area 41.

The holder 33 centrally thereof is formed with a pair of radially directed, oppositely positioned passages 42 and 43 having mounted therein tubes 44 and 45 respectively. Each of the tubes 44 and 45 are in communication with separate longitudinally extending grooves 46 and 47 respectively, these grooves being formed in spaced relation in outer surface portions of the extruding tube 38. The tubes 46 and 47 terminate at their inner ends in radial shoulder portions 48. The outermost ends of the grooves 46 and 47 as best shown in FIGS. 7, 8 and 9, terminate in radial enlargements 49. These radial enlargements are each longitudinally spaced and separated from one another and extend circumferentially of the extruding tube 38 through slightly more than 180° on opposite sides thereof. The grooves 46 and 47 are in communication with their respective enlargements 49 centrally of the same.

An extruding tube sleeve 50 is received about the extruding tube 38 in snug engagement with the outer surface thereof and in overlying confining relation with the spaced longitudinal grooves 46 and 47 and the enlargements 49 thereof. The inner end of the sleeve as shown in FIGS. 5 and 10 is formed with a radially outwardly projecting, circumferentially continuous locking rib 51 which is received in an annular recess 52 formed in the outer end of the tube holder 33. An O-ring gasket 53 is confined in the innermost portion of the recess 52 in abutment with the ribs 51 to form a seal about the grooves 46 and 47. A locking nut 54 is received about the innermost end of the sleeve 50 and an externally threaded portion 55 thereof is threadedly received in the outer end of the holder 33 in end abutment with the rib 51 to lock the sleeve 50 in operative position.

The outer end of the sleeve 50 has suitably fixed thereabout an extrusion nozzle 56 formed with an inner enlarged bore 57 receiving snugly therein the sleeve 50 and extruding tube 38. A circumferential internal shoulder 58 is formed in the nozzle 56 and is in abutment with the other end surfaces of the tube 30 and sleeve 50. An internal flared passage 59 is formed in the outer end of the nozzle 56 and receives sausage emulsion therethrough for direct extrusion into a casing 60 received about the nozzle and sleeve.

The innermost end of the nozzle 56 is formed with an outwardly inclined surface portion 61 terminating outwardly thereof in a plurality of circumferential ribs 62 which serve to space the casing radially outwardly from the outer surface of the nozzle 56. Immediately outwardly of the ribs 62 the nozzle 56 is formed with a radially directed aperture or passage 63 which is aligned with an aperture 64 formed in the sleeve 50 which in turn is in communication with the enlargement 49 ofthe groove 47. Immediately outwardly of the passage 63 the nozzle 56 has mounted thereabout a sleeve-like shield 65 which extends longitudinally outwardly in spaced overlying relation to the adjacent outer surface of the nozzle 56. The sleeve 65 overextends a radial aperture of passage 66 formed in the nozzle 56 and aligned with an aperture 67 formed in the sleeve 50 which is in communication with the enlargement 49 of the groove 46. The shielding sleeve 65 is spaced radially outwardly from the passage 66 to permit the ertrusion of coating material between the sleeve and the outer surface of the nozzle 56.

Separate dispersions of acid and alkaline collagen may be introduced into the apparatus through either of the tubes 44 and 45. For purposes of describing the operation of the apparatus it will be assumed that alkaline collagen is introduced under pressure into the tube 44 and is delivered therefrom along the groove 46 into its enlargement 49 and through the aligned aperture and passage 67 and 66 onto the outer surface of the nozzle 56. The shielding sleeve 65 directs the extruded dispersion longitudinally outwardly along the nozzle 56. Acidic collagen dispersion is introduced into the apparatus under pressure through the tube 45 into the groove 47 through the enlargement 40 thereof into the aperture and passage 64 and 63 and onto the outer surface of the nozzle 56 immediately rearwardly of the shielding sleeve 65. Uniform delivery of the acidic dispersion about the nozzle 56 is made possible by the spacing of the casing 60 from the outer surface of the nozzle by the ribs 62. The acidic dispersion is confined by nozzle by the ribs 62. The acidic dispersion is confined bf the casing 60 and is injected outwardly along the nozzle about the outer surface of the shielding sleeve 65 and ultimately contacts the basic dispersion just prior to the final collagen coating.

The stuffing horn 32 described is designed for ready assembly and disassembly for efficient maintenance and cleaning purposes and constitutes on uncomplicated means by which two separate dispersions can be efficiently used in a continuous manner. When practicing the method with the use of combined acidic and basic collagen dispersions it may be found preferable to subject the stuffed product to water bath treatment, i.e. for about 30 seconds to remove unwanted residual salt.

FIGS. 11–13 illustrate a further modified form of stuffing horn 75 which, in accordance with the present invention, is adapted to provide simultoneous extruhion of swelled collagen dispersion and sausage emulsion into a water permeable casing 76.

As is shown, suffiing horn 75 includes a tube holder 77 threadedly engaged to a coupling section 78 adapted to be connected to a sausage emulsion delivery pipe (not illustrated) at its open end 79. An integral flare passage 80a in coupling section 78 tapers into a constant diameter passage 80b which in turn communicates with an emulsion delivery passage 81 in extruding tube 82. The inner end of extruding tube 82 is formed with a flared section 83 which generally conforms to the passage 80b.

In the embodiment specifically illustrated in FIGS. 11–13, tube holder 77 is provided with a single radially directed passage 84 which communicate with a longitudinally extending annular groove 85 terminated at opposite ends by radial shoulders 86 and 87, respectively, of extruding tube 82. An extruding tube sleeve 88 is received around the extruding tube 82 in snug engagement with the outer surface thereof and in overlying relation with the annular groove 85.

The outer end of sleeve 88 has suitably fixed thereabout an extrusion nozzle 89 which is fixed to extruding tube 82 by a pair of pins 90a with an O-ring gasket 90b confined between the outermost end of tube 82 and the radially inwardly directed shoulder 89a of nozzle 89.

The innermost end of the nozzle 89 is formed with an outwardly inclined surface portion 91 terminating outwardly thereof in a plurality of circumferential ribs 92 which serve to space the casing radially from the outer surface if the nozzle 89. Immediately inwardly of the ribs 92 the nozzle 89 is formed with a plurality of radially directed apertures or passages 93 which are aligned with apertures 94 in sleeve 88 to enable the extrusion of coating material from the annular groove 85 onto the outer surface of nozzle 89.

In accordance with an important aspect of the present invention the outer end or tip portion 95 of the extrusion nozzle 89 is of a novel design which produces an orderly arrangement of lean particles on the surface of sausage products made therewith. In particular, the extrusion nozzle tip 95 is provided with a casing alignment means (i.e. the outer diameter of nozzle portion 89b is sized to be slightly larger than the inner diameter of water permeable casing 76) which maintains the casing in concentric alignment with a relatively small center orifice 96 and (abruptly flared end wall 97 thereby enabling the ground material to expand and migrate to the casing surface in a rapid and particulate manner which avoids fat-smeared surface.

While thin novel tip design is adapted for conjoint operation with the simultaneous collagen-sausage extrusion apparatus of the present invention, it should be noted that the design can also be advantageously employed in conventional stuffing apparatus wherein sausage batter or emulsion is extruded into uniformly sized casings. In particular, this aspect of the present invention provides improved appearance in all high fat sausage products such as, for example, pork sausage, Bratwurst, Smokey Links and the like. Stuffing nozzles of the type having a gradually flared tip tend to smear fat particles over the lean particles in these high fat sausage products.

As is best shown in FIG. 11, orifice 96 is centrally disposed in the nozzle tip 95 thereby allowing particles of sausage batter to reach the generally concentrically disposed casing surface in all directions with equal opportunity. The orifice 96 is of relatively small diameter compared to the diameter of the horn tip 95. The particular dimensions of the orifice and tip will be dependent upon the diameter of the product being formed. For example, a pork sausage stuffing nozzle having an orifice internal diameter of about 0.265 inch and a nozzle outer diameter of about 0.710 inch when combined with an abruptly flared end wall will provide the improved particle distribution referred to above. Of course, slight variations in these precise dimensions can be made without departure from the scope of the present invention.

In the embodiment of the invention illustrated in FIG. 11, end wall 97 is provided with an abruptly tapered surface. It has been observed that as the angle α (measured from the perpendicular) increases, the tendency of the fat particles to smear increases. In this connection, an angle α of from about 15° to 20° is generally preferred. With an end wall 97 of this angular configuration, sausage emulsion will emerge from the orifice 96 at an angle of between 70° and 75° from the direction of flow through the horn. On the other hand, nozzle tips having a gradually flared orifice (where angle α is about 85°) release the sausage emulsion at an angle of about 5° from the direction of flow resulting in a slow expansion of the fat and lean particles with considerably less lean particle distinctions and more evidence of fat smearing at the surface of the sausage product. In operation, sausage batter is fed into flare passage 80a under pressure from a suitably sized emulsion delivery pipe extending from a stuffing cylinder. Simultaneously, a coating material (preferably a lactic acid swelled collagen) is discharged into annular groove 85 through inlet 84. A water permeable casing mold 76 fitted around extruding tube sleeve 88 is directed around the inclined surface 91 of nozzle 89 and from there travels toward the tip 95 of the nozzle 89. The coating material is extruded through aligned passages 93, 94 formed in the nozzle 89 and sleeve 88, respectively, onto the outer surface of nozzle 89 where it is transferred to the inner surface 76a of the casing. Sausage emulsion, discharged from orifice 96 then rapidly expands to form an intermediate sausage product consisting of an outer water permeable casing mold and a swelled collagen dispersion coating over the extruded sausage batter which is then further treated in accordance with the present invention as previously described.

FIG. 14 illustrates a modified nozzle assembly 100 which is equipped with a sleeve 101 and nozzle component 102 which are adapted to receive a replaceable nozzle tip 103. Examples of other nozzle tips 104 and 105 which can be used in nozzle assembly 100 are shown in FIGS. 16 and 17, respectively. Each of these nozzle tips (103, 104 and 105) is adapted to provide the improved lean particle definition and non-fat smeared sausage surface described above in connection with extrusion nozzle tip 95.

Nozzle assembly 100 includes an inner extruding tube 106 which co-operates with tapered element 107 and sleeve 101 to define an annular chamber 108 through which the coating material passes. Apertures 101a in sleeve 101 enable the coating material to pass onto the outer surface 101b of sleeve 101. Nozzle component 102 is fixed to sleeve 101 and extruding tube 106 by means of a pair of pins 109.

Nozzle tip 103 includes a stud portion 110 which is threadedly received within socket portion 111 of sleeve 101. As is shown, nozzle tip 103 is provided with a perpendicular end face 112 (perpendicular with respect to the longitudinal axis of nozzle assembly 100) which allows the sausage batter to emerge from tip 103 at an angle of 90° from the direction of flow through the horn. Central opening 113 in nozzle tip 103 is sized in accordance with the present invention to enable the sausage batter to expand in a rapid and particulate manner to provide an improved sausage product as was described above in connection with the embodiment of the invention illustrated in FIGS. 11-13.

Nozzle tip 104, shown in FIG. 16, has a circular cross section with a threaded stud portion 114 sized to be received in threaded socket 111 of sleeve 101. This particular nozzle tip closely resembles the outer end portion 95 of nozzle 89 in that it is provided with a relatively small central orifice 115 and an abruptly flared outer surface 116. The angle β of the outer surface 116 is preferably between 5° and 20°. As this angle β becomes larger, there is a gradual increase in the amount of fat smearing which appears on the product surface. Sizing of orifice 115 so as to accomplish a rapid expansion of the sausage batter will produce a pork sausage product wherein the lean particles show up much more prominently than they would if a gradually flared nozzle tip were employed.

FIG. 17 illustrates a further modification of nozzle tip 105 which, in accordance with the present invention, will also provide an improved sausage product, as is shown, nozzle tip 105 includes a threaded stud portion 117, a central orifice or passage 118 and an outer end surface 119 which has a concave configuration rather than the convex configuration of end wall 116. Good lean particle definition on the surface of the sausage product is obtained with nozzle tip 105 where the central passage or opening 118 is sized so as to enable the rapid expansion of sausage batter therefrom. Nozzle tips of the basic design illustrated in FIG. 17 when tested produced a sausage product with substantially better lean particle definition on the surface than are obtainable with nozzle tips of the gradual flared design. The nozzle tips used in making pork sausages had central orifice diameters of around 0.265 inch outer diameters of the tip elements of approximately 0.675 inch and concave angle γ of between 60° and 75°. These particular dimensions are only to be considered as illustrative of working models which have been successfully tested.

Certain modifications and variations of the invention as hereinbefore set forth may be made without departing from the spirit and scope thereof.

We claim:

1. In an apparatus having a stuffing horn nozzle for extruding a sausage emulsion into a casing, the improvement comprising a tip portion on said stuffing horn nozzle having a central orifice which is sized to promote expansion of the sausage emulsion immediately upon its exit from said orifice and migration to the casing surface in a rapid and particulate manner, said tip portion having an end wall which abruptly tapers outwardly from said central orifice to the periphery of said tip portion, the angle of taper of said end wall measured from a plane perpendicular to the longitudinal axis of said stuffing nozzle being from approximately 15° to 20°, said tip portion being further equipped with means for aligning said casing concentrically with said central orifice, whereby the smearing of fat particles on the surface of the casing is substantially reduced and the lean particles in said sausage emulsion more prominently displayed on the surface of said casing.

2. In an apparatus having a stuffing horn nozzle for extruding a sausage emulsion into a casing, the improvement comprising a tip portion on said stuffing horn nozzle having a central orifice of relatively small diameter in comparison to the outer diameter of said tip portion adjacent said orifice for promoting expansion of the sausage emulsion immediately upon its exit from said orifice and migration to the inner surface of the casing in a rapid and particulate manner, said tip portion haivng an abruptly tapered outwardly flared end wall wherein the angle of taper of said end wall measured from a plane perpendicular to the longitudinal axis of said stuffing horn nozzle is approximately 15° to 20°, said tip portion being further equipped with means for aligning said casing concentrically with said central orifice, whereby the smearing of fat particles on the surface of said casing is substantially reduced and lean particles in said sausage emulsion are prominently displayed on the surface of said casing.

References Cited

UNITED STATES PATENTS

| | | | |
|---|---|---|---|
| 1,518,511 | 12/1924 | Henderson | 17—41 |
| 2,871,508 | 2/1959 | Hill | 17—41 |
| 2,886,073 | 5/1959 | Beck | 17—35 X |
| 3,010,144 | 11/1961 | Kochjohann | 17—33 X |
| 3,237,662 | 3/1966 | Hawley. | |

LUCIE H. LAUDENSLAGER, Primary Examiner

U.S. Cl. X.R.

17—35

PO-1050
(5/69)

UNITED STATES PATENT OFFICE
CERTIFICATE OF CORRECTION

Patent No. 3,473,190      Dated October 21, 1969

Inventor(s) Elwood W. Kielsmeier and William D. Paynter

It is certified that error appears in the above-identified patent and that said Letters Patent are hereby corrected as shown below:

Column 2, line 19, the word "project" should read --product--
Column 2, line 32, the word "extension" should read --extrusion--
Column 2, line 60, the words "acid/or" should read --acid and/or--
Column 5, line 60, "persons" should read --persions--
Column 6, line 7, the word "in" should read --is--
Column 6, line 15, the word "soil" should read --salt--
Column 7, line 61, the word "celluosic" should read --cellulosic--
Column 8, line 1, the word "rave" should read --have--
Column 8, line 20, the word "suply" should read --supply--
Column 9, line 61, after "second" insert a period (.)
Column 10, line 67, "er-" should read "ex-"
Column 11, line 14, the word "bf" should read --by--
Column 11, line 29, the word "simultoneous" should read --simultaneous--
Column 11, line 29, the word "extruhion" should read --extrusion--
Column 11, line 32, the word "suffing" should read --stuffing--
Column 11, line 59, the word "if" should read --of--
Column 11, line 75, delete the parenthesis before the word "abruptly"
Column 12, line 4, the word "thin" should read --this--
Column 12, line 49, delete the comma after the word "cylinder" and insert a period

PO-1050
(5/69)

UNITED STATES PATENT OFFICE
CERTIFICATE OF CORRECTION

Patent No. 3,473,190     Dated  October 21, 1969

Inventor(s) Elwood W. Kielsmeier and William D. Paynter

It is certified that error appears in the above-identified patent and that said Letters Patent are hereby corrected as shown below:

Page 2

Column 14, line 33, the word "haivng" should read --having--

SIGNED AND
SEALED
JUN 2 1970

(SEAL)
Attest:

Edward M. Fletcher, Jr.
Attesting Officer

WILLIAM E. SCHUYLER, JR.
Commissioner of Patents